(12) United States Patent
Takahashi

(10) Patent No.: US 9,090,256 B2
(45) Date of Patent: Jul. 28, 2015

(54) VEHICLE CONTROL DEVICE

(75) Inventor: Tomoya Takahashi, Ebina (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/001,961

(22) PCT Filed: Mar. 30, 2011

(86) PCT No.: PCT/JP2011/058135
§ 371 (c)(1),
(2), (4) Date: Aug. 28, 2013

(87) PCT Pub. No.: WO2012/131958
PCT Pub. Date: Oct. 4, 2012

(65) Prior Publication Data
US 2014/0011630 A1    Jan. 9, 2014

(51) Int. Cl.
B60K 1/02 (2006.01)
B60W 20/00 (2006.01)
B60K 6/48 (2007.10)
B60W 10/02 (2006.01)
B60W 10/06 (2006.01)
B60W 10/08 (2006.01)
B60W 10/184 (2012.01)

(52) U.S. Cl.
CPC .................. *B60W 20/40* (2013.01); *B60K 6/48* (2013.01); *B60W 10/02* (2013.01); *B60W 10/06* (2013.01); *B60W 10/08* (2013.01); *B60W 10/184* (2013.01); *B60W 20/00* (2013.01); B60K 2006/4808 (2013.01); B60W 2540/12 (2013.01); B60W 2540/14 (2013.01); B60W 2710/083 (2013.01); Y02T 10/48 (2013.01); Y02T 10/626 (2013.01); *Y02T 10/6221* (2013.01); *Y02T 10/6286* (2013.01); *Y10S 903/902* (2013.01); *Y10T 477/24* (2015.01); *Y10T 477/26* (2015.01)

(58) Field of Classification Search
USPC ............... 477/4, 5, 9, 71, 171, 172, 184, 188, 477/203, 211; 903/930, 946, 947
See application file for complete search history.

(56) References Cited

U.S. PATENT DOCUMENTS

| 6,077,186 A | 6/2000 | Kojima et al. |
| 7,178,617 B2* | 2/2007 | Morisawa et al. ........ 180/65.265 |
| 8,141,534 B2* | 3/2012 | Liu et al. .................... 123/179.4 |
| 2008/0076623 A1 | 3/2008 | Tabata et al. |

FOREIGN PATENT DOCUMENTS

| DE | 10 2006 030 102 A1 | 1/2007 |
| JP | A-8-182114 | 7/1996 |

(Continued)

*Primary Examiner* — Justin Holmes
(74) *Attorney, Agent, or Firm* — Oliff PLC

(57) ABSTRACT

A vehicle control device includes an engine, a motor disposed nearer to drive wheel sides than the engine in a vehicle, and a clutch disposed between the engine and the motor and configured to be engaged or released according to an operation input, wherein at the time the clutch is engaged to connect the engine and the drive wheels while the vehicle travels with the engine being stopped, the engine is started by the power transmitted to the engine via the clutch as well as the motor is caused to output assist torque for suppressing a reduction of acceleration of the vehicle caused by that the clutch is engaged, and the assist torque when a braking operation is performed is smaller than the assist torque when the braking operation is not performed.

9 Claims, 11 Drawing Sheets

(56) References Cited

FOREIGN PATENT DOCUMENTS

| JP | A-11-178113 | 7/1999 |
| JP | A-2006-240608 | 9/2006 |
| JP | A-2009-227277 | 10/2009 |
| JP | A-2011-5904 | 1/2011 |
| WO | WO 2012/131959 A1 | 10/2012 |

* cited by examiner

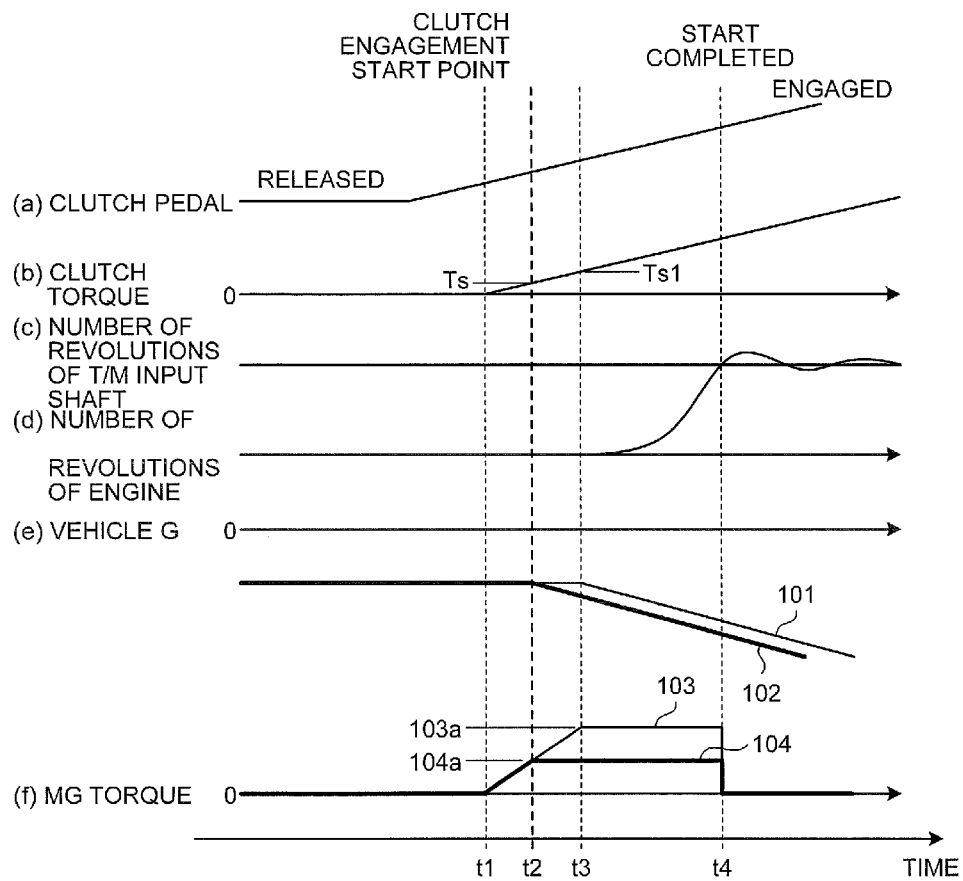
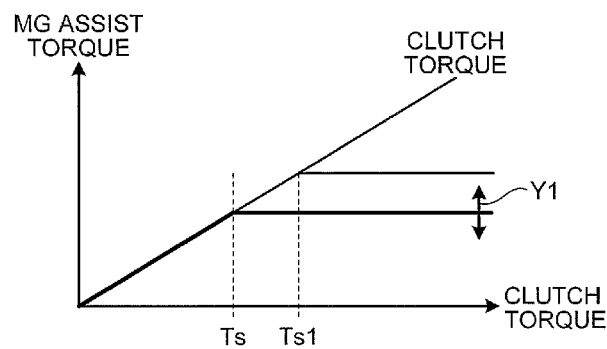

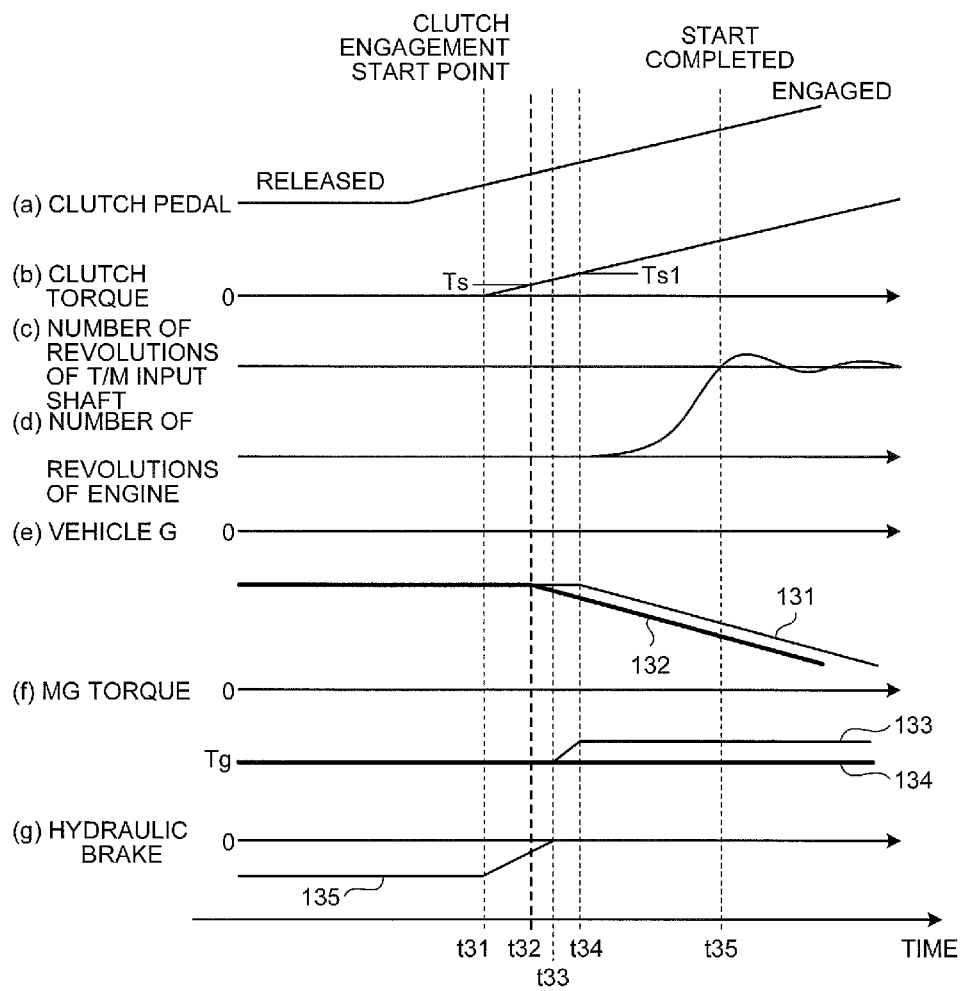

VEHICLE CONTROL DEVICE

FIELD

The present invention relates to a vehicle control device.

BACKGROUND

Conventionally, it is proposed to cause a motor to output torque when an engine starts during traveling. For example, Patent Literature 1 discloses a technology of a drive control device of a hybrid vehicle provided with an assist amount setting means, wherein the assist amount setting means increases output torque of an electric motor by motoring torque necessary to rotate an internal combustion engine or by torque corresponding to torque obtained by adding inertia torque according to a change rate of a number of revolutions of the internal combustion engine to the motoring torque when it is determined by a start request determining means that a request for starting the internal combustion engine is issued.

CITATION LIST

Patent Literature

Patent Literature 1: Japanese Patent Application Laid-open No. 11-178113

SUMMARY

Technical Problem

When a motor is caused to output torque, power is consumed by the motor. It is desired to be able to suppress power consumption of the motor by causing the motor to output appropriate torque when an engine starts, and the like.

An object of the present invention is to provide a vehicle control device capable of suppressing power consumption when a motor is caused to output torque at the time an engine starts during traveling.

Solution to Problem

A vehicle control device according to the present invention includes an engine; a motor disposed nearer to drive wheel sides than the engine in a vehicle; and a clutch disposed between the engine and the motor and configured to be engaged or released according to an operation input, wherein at the time the clutch is engaged to connect the engine and drive wheels while the vehicle travels with the engine being stopped, the engine is started by the power transmitted to the engine via the clutch as well as the motor is caused to output assist torque for suppressing a reduction of acceleration of the vehicle caused by that the clutch is engaged, and the assist torque when a braking operation is performed is smaller than the assist torque when the braking operation is not performed.

In the vehicle control device, it is preferable that a preset predetermined torque is set as an upper limit and the assist torque is increased according to an increase of a degree of engagement of the clutch at the time the clutch is engaged, and the predetermined torque when the braking operation is performed is preferably smaller than the predetermined torque when the braking operation is not performed.

In the vehicle control device, it is preferable to further include a braking device capable of controlling brake force, wherein at the time the clutch is engaged to connect the engine and the drive wheels while the vehicle travels with the engine being stopped, the motor and the braking device are preferably cooperatively controlled based on a target deceleration force based on the braking operation.

In the vehicle control device, it is preferable that the braking device is caused to output at least a part of the assist torque in place of the motor.

In the vehicle control device, it is preferable that a generation of deceleration force by a regeneration of the motor is preceded to a generation of deceleration force by the braking device.

In the vehicle control device, it is preferable that the predetermined torque when a braking operation is not performed corresponds to the degree of engagement of the clutch at which cranking of the engine starts.

In the vehicle control device, it is preferable to further include a manual transmission disposed between the clutch and the drive wheels, wherein a hybrid travel, in which the vehicle is caused to travel by the power of the engine and the power of the motor, and an EV travel, in which the vehicle is caused to travel by the power of the motor without depending on the power of the engine when the manual transmission is in a neutral state, can be preferably executed, and when a gear shift stage for the hybrid travel is selected in the manual transmission during the EV travel as well as when the clutch is engaged to shift the EV travel to the hybrid travel, the motor is preferably caused to output the assist torque.

Advantageous Effects of Invention

In the vehicle control device according to the present invention, when the clutch is engaged and the engine is connected to the drive wheels while the vehicle travels with the engine being stopped, the engine is started by the power transmitted to the engine via the clutch as well as the motor is caused to output the assist torque for suppress a reduction of acceleration of the vehicle caused by that the clutch is engaged. The assist torque when the braking operation is performed is smaller than the assist torque when the braking operation is not performed. Therefore, according to the vehicle control device according to the present invention, an effect is achieved in that power consumption can be suppressed when the motor is caused to output torque at the time the engine starts while the vehicle travels.

BRIEF DESCRIPTION OF DRAWINGS

FIG. 5 is a time chart according to a vehicle control of the first embodiment.

FIG. 6 is an explanatory view of assist upper limit torque.

FIG. 15 is a time chart according to the vehicle control when the second target torque is smaller than the regenerative maximum torque.

DESCRIPTION OF EMBODIMENTS

A vehicle control device according to embodiments of the present invention will be explained below in detail referring to drawings. Note that the present invention is not limited by the embodiments. Further, components in the embodiments include components that can be easily conceived by a person skilled in the art or substantially same components.

First Embodiment

Figure 1:
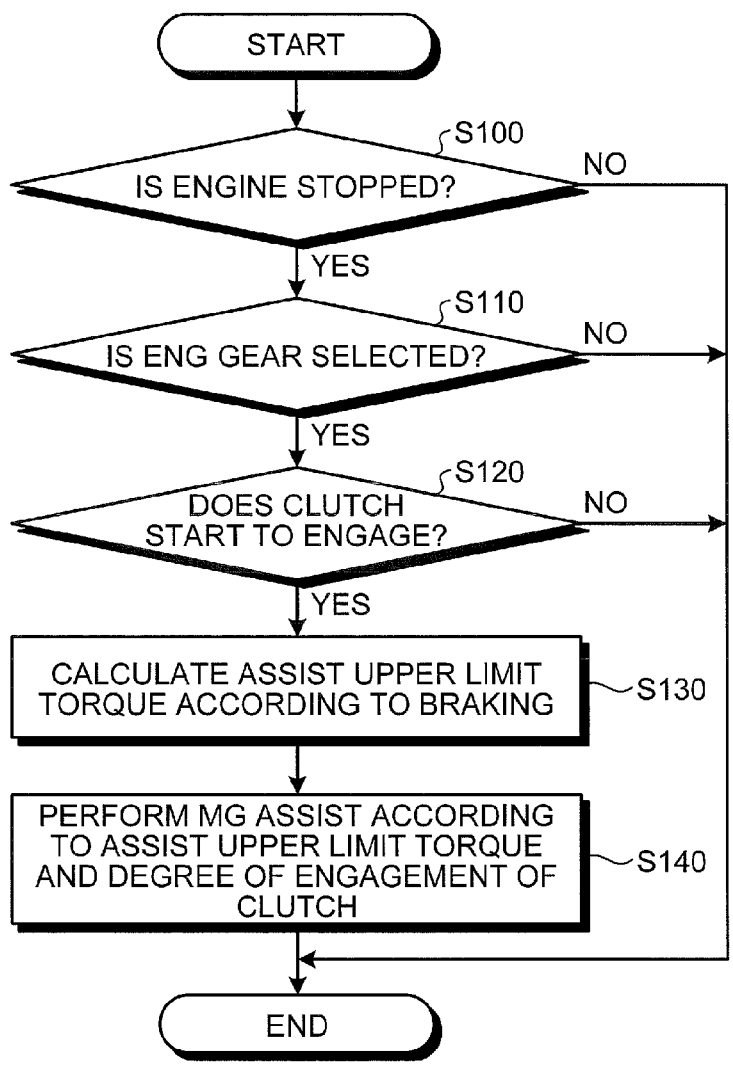
FIG. 1 is a flowchart illustrating an operation of a first embodiment.
Figure 2:
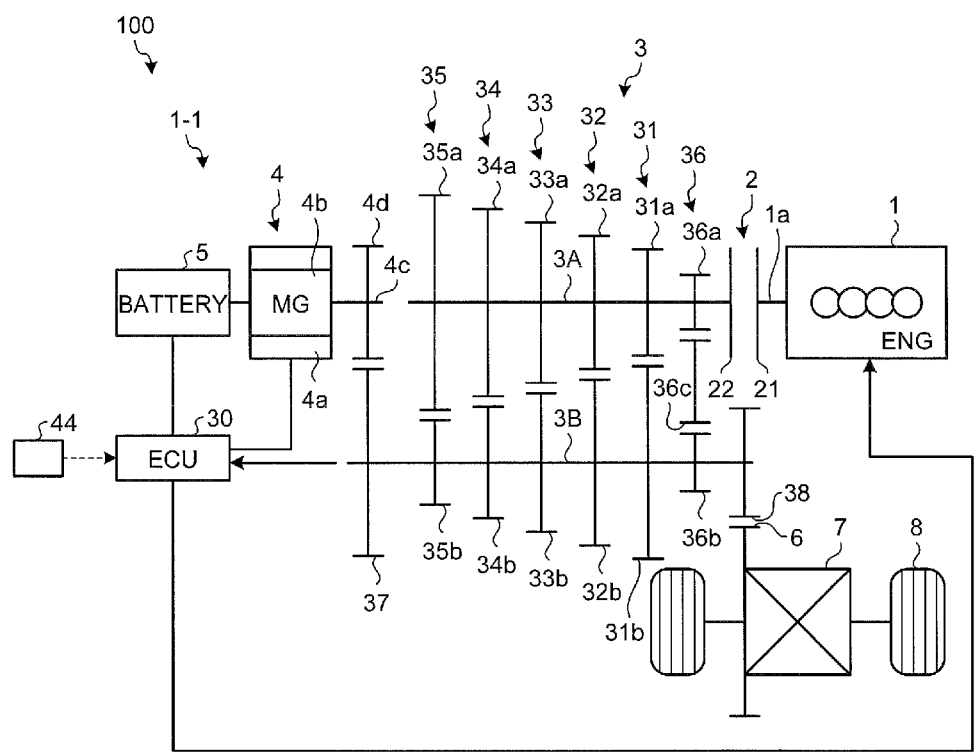
FIG. 2 is a view illustrating a schematic configuration of a vehicle according to the first embodiment.

A first embodiment will be explained referring to FIGS. 1 to 7. The embodiment relates to a vehicle control device. FIG. 1 is a flowchart illustrating an operation of the first embodiment, and FIG. 2 is a view illustrating a schematic configuration of a vehicle according to the first embodiment.

In a vehicle control device 1-1 of the embodiment, a motor (refer to reference sign 4 of FIG. 2) is disposed nearer to drive wheels side than a clutch (refer to reference sign 2 of FIG. 2) as well as controls a vehicle on which a three-pedal system is mounted. While the vehicle travels with an engine being stopped (refer to reference sign 1 of FIG. 2), the vehicle control device 1-1 starts the engine 1 at a timing when a driver selects an engine travel gear and engages the clutch 2. At the time, an occurrence of a feeling of deceleration is suppressed by a motor assist until a degree of engagement of the clutch, at which clutch torque capable of performing cranking is generated, is reached. With the operation, it is suppressed that the driver stops a clutch pedal return operation before the cranking starts due to the occurrence of the feeling of deceleration, and thereby the engine can be started certainly.

Here, when the operation for engaging the clutch 2 by selecting the engine travel gear is performed while depressing a brake, the driver intends to decelerate the vehicle. At the time, when the motor assist is performed likewise when the braking operation is not performed, electric power is wastefully consumed. The vehicle control device 1-1 of the embodiment reduces torque in order to cancel the feeling of deceleration when the brake is depressed. With the operation, power can be saved by reducing an assist amount of the motor 4.

In the embodiment, it is made a premise that the vehicle is mounted with systems described below.
(1) a three-pedal system;
(2) a system in which the MG is disposed nearer to the vehicle side (the drive wheels side) than the clutch (MG may be positioned at any of an input shaft or on an output shaft of a T/M); and
(3) a system in which the engine can be stopped during traveling.

As illustrated in FIG. 2, a hybrid vehicle 100 according to the embodiment includes the engine 1, the clutch 2, a manual transmission 3, the motor 4, and an ECU 30. Further, the vehicle control device 1-1 according to the embodiment includes the engine 1, the motor 4, the clutch 2, and the ECU 30.

The engine 1 can function as a power source of the hybrid vehicle 100. The engine 1 converts combustion energy of a fuel to rotational movement of an output shaft 1a and outputs the converted energy. The output shaft 1a is connected to an input shaft 3A of the manual transmission 3 via the clutch 2.

The clutch 2 is disposed to a power transmitting path between the engine 1 and the input shaft 3A of the manual transmission 3 and connects or blocks a transmission of the power between the engine 1 and the input shaft 3A according to an input of the driver. The clutch 2 is, for example, a friction-engagement type clutch device and has an input side engaging member 21 and an output side engaging member 22. The input side engaging member 21 is coupled with the output shaft 1a of the engine 1 and the output side engaging member 22 is coupled with the input shaft 3A of the manual transmission 3. The clutch 2 connects the transmission of power between the engine 1 and the input shaft 3A by that the input side engaging member 21 is engaged with the output side engaging member 22 and blocks the transmission of power between the engine 1 and the input shaft 3A when the input side engaging member 21 is released (separated) from the output side engaging member 22. The clutch 2 is engaged or released by an operation input of the driver to a clutch pedal and cannot be optionally operated on the vehicle side.

Figure 3:
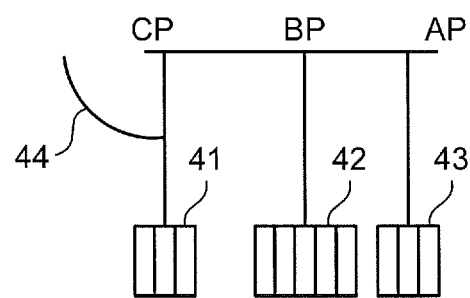
FIG. 3 is a view illustrating a pedal layout of a hybrid vehicle.

FIG. 3 is a view illustrating a pedal layout of the hybrid vehicle 100. As illustrated in FIG. 3, the hybrid vehicle 100 includes three pedals, i.e. a clutch pedal 41, a brake pedal 42, and an accelerator pedal 43. The clutch 2 is released by that the clutch pedal 41 is depressed, and the clutch 2 is engaged when the clutch pedal 41 is released. The clutch pedal 41 is provided with a clutch pedal stroke sensor 44 for detecting a pedal stroke of the clutch pedal 41.

Returning to FIG. 2, the motor (MG) 4 has a stator 4a and a rotor 4b. The rotor 4b is connected to a rotating shaft 4c and rotates integrally with the rotating shaft 4c using the rotating shaft 4c as a center of rotation. The rotating shaft 4c is provided with an MG gear 4d which rotates integrally with the rotating shaft 4c. The motor 4 is an electric motor which is connected to a battery 5 and outputs power to the rotating shaft 4c by consuming electric power supplied from the battery 5. Note that the motor 4 can function also as a generator for converting power transmitted thereto via the rotating shaft 4c to electric power and outputs the electric power.

The manual transmission 3 is a manual shift type transmission by which a gear is shifted by that the driver operates a shift lever. The manual transmission 3 has the input shaft 3A, an output shaft 3B, and a not illustrated synchronizing device. The manual transmission 3 is a constant mesh type transmission and has plural forward travel gear pairs 31, 32, 33, 34, 35 which are constantly meshed and a rearward travel gear pair 36. The synchronizing device has a synchronization mechanism for synchronizing a rotation of the input shaft 3A with a rotation of the output shaft 3B in association with a shift operation to the shift lever.

The respective forward travel gear pairs 31, 32, 33, 34, 35 form gear shift stages which have a different gear shift ratio, respectively. The first gear pair 31 has an input gear 31a, which is disposed to the input shaft 3A as well as is free to relatively rotate to the input shaft 3A, and an output gear 31b which is disposed on the output shaft 3B as well as cannot relatively rotate to the output shaft 3B. The second gear pair 32, the third gear pair 33, the fourth gear pair 34, the fifth gear pair 35, and the rearward travel gear pair 36 have input gears 32a, 33a, 34a, 35a, 36a similar to the input gear 31a and output gears 32b, 33b, 34b, 35b, 36b similar to the output gear 31b, respectively. In the rearward travel gear pair 36, the input gear 36a is connected to the output gear 36b via an intermediate gear 36c. The output shaft 3B is disposed with an output gear 37. The output gear 37 is coupled with the output shaft 3B so as not to be able to relatively rotate to the output shaft 3B. The output gear 37 is meshed with the MG gear 4d of the motor 4. That is, the motor 4 is disposed nearer to drive wheels 8 side than the engine 1 and the clutch 2.

The synchronizing device connects a transmission of power between the input shaft 3A and the output shaft 3B by the gear pairs 31, 32, 33, 34, 35, 36 by, for example, being selectively engaged with any of the gear pairs 31, 32, 33, 34, 35, 36 and synchronizing a rotation of the input shaft 3A with a rotation of the output shaft 3B. The synchronizing device is operated in association with the operation input to the shift lever and is engaged with a gear pair corresponding to a range selected by the shift lever. Further, the synchronizing device places the manual transmission 3 in a neutral state by disconnecting all the gear pairs from the input shaft 3A when the shift lever is operated to an N range and an EV range.

The output shaft 3B of the manual transmission 3 is connected with a pinion gear 38. The pinion gear 38 is meshed with a differential ring gear 6. The differential ring gear 6 is connected to the right/left drive wheels 8 via a differential mechanism 7. The power of the engine 1 and the motor 4 output to the output shaft 3B is transmitted to the drive wheels 8 via the pinion gear 38, the differential ring gear 6, and the differential mechanism 7.

The ECU 30 is an electronic control unit having a computer and has a function as a travel control device of the hybrid vehicle 100. The ECU 30 is connected to the engine 1, the clutch 2, the manual transmission 3, and the motor 4. The ECU 30 can execute a fuel injection control, an ignition control, a start control, and the like of the engine 1. Further, the clutch pedal stroke sensor 44 is connected to the ECU 30. The ECU 30 can detect a degree of engagement of the clutch 2 based on a signal input from the clutch pedal stroke sensor 44. Note that the ECU 30 may obtain the degree of engagement of the clutch 2 based on a result of detection of a clutch stroke sensor for detecting a stroke of the clutch 2 in place of a result of detection of the clutch pedal stroke sensor 44.

Further, the ECU 30 can control the motor 4 and output power to the motor 4. The power output by the motor 4 is transmitted to the drive wheels 8 via the output shaft 3B and the differential mechanism 7 and becomes drive force for causing the hybrid vehicle 100 to travel. Further, the ECU 30 can cause the motor 4 to also generate electric power. The ECU 30 can control a magnitude of the power output by the motor 4 and an amount of power generated by the motor 4. Note that, in the description, as to torque acting on the drive wheels 8, torque for driving the hybrid vehicle 100 forward is described as positive torque and torque for driving the hybrid vehicle 100 rearward is described as negative torque or brake torque. The ECU 30 can cause the motor 4 to output any of the positive torque or the negative torque. The ECU 30 can control brake torque due to a power generation load of the motor 4 by adjusting, for example, the power generation amount of the motor 4. Note that, in the following explanation, the output torque of the motor 4 is described also as "MG torque".

The ECU 30 is input with signals showing a result of detection of a shift position sensor and a neutral switch of the manual transmission 3, respectively. The shift position sensor detects a range selected in the manual transmission 3. The neutral switch detects that the manual transmission 3 is in the neutral state, in other words, that the transmission of power between the input shaft 3A and the output shaft 3B is blocked.

The ECU 30 is connected to the battery 5 and can control a charge and a discharge of the battery 5. Further, the ECU 30 is connected to a sensor for detecting a voltage, a charged/discharged current, and the like of the battery 5 and can obtain a charged amount SOC of the battery 5 based on a result of detection of the sensor.

The ECU 30 calculates requested torque or requested drive force which is to be transmitted to the drive wheels 8 based on conditions such as a vehicle speed, an accelerator open degree, and the like and controls the engine 1 and the motor 4 based on a result of calculation. The ECU 30 can execute a hybrid travel, in which the hybrid vehicle 100 is caused to travel by the power output by the engine 1 and the motor 4, and an EV travel in which the hybrid vehicle 100 is caused to travel by the power of the motor 4 without depending on the power of the engine 1.

Figure 4:
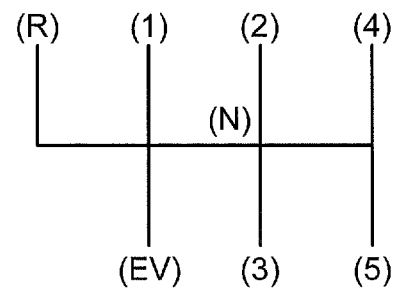
FIG. 4 is a view illustrating an example of a shift interface (shift pattern) of a shift lever according to the first embodiment.

FIG. 4 is a view illustrating an example of a shift interface (shift pattern) of the shift lever. The shift lever of the manual transmission 3 is provided with an R (rearward) range, an N (neutral) range, and an EV range in addition to five ranges (shift positions) corresponding to the gear shift stages from a first gear speed to a fifth gear speed. The EV range is a range for instructing to perform the EV travel. When a shift position is operated to the five ranges from the first gear speed to the fifth gear speed, the power of the engine 1 is transmitted from the input shaft 3A to the output shaft 3B via a gear pair corresponding to the shift position.

The ECU 30 causes the hybrid vehicle 100 to travel in the hybrid travel when any of the five ranges from the first gear speed to the fifth gear speed is selected. In the hybrid travel, the ECU 30 causes the hybrid vehicle 100 to travel by the power of the engine 1. Further, it is possible for the ECU 30 to cause the motor 4 to assist the engine 1 by outputting positive torque and to cause the motor 4 to generate electric power by driving the motor 4 by the power of the engine 1, respectively. Further, it is possible for the ECU 30 to cause the motor 4 to perform a regenerative power generation when the hybrid vehicle 100 is decelerated, and the like.

When the EV range is selected, the manual transmission 3 is placed in the neutral state in association with that the shift lever is operated to the EV range. With the operation, while the EV range is selected, a transmission of power between the engine 1 and the output shaft 3B is shut off. The ECU 30 executes the EV travel by stopping the engine 1 when the EV range is selected. The ECU 30 controls the output torque of the motor 4 to realize the requested torque.

The ECU 30 starts the engine 1 again when a gear is shifted to any of the gear shift stages from the first gear speed to the fifth gear speed for forward travel by the input operation of the driver during the EV travel as well as the clutch 2 is engaged. In other words, the ECU 30 starts the engine 1 when the clutch 2 is engaged and the engine 1 is connected to the drive wheels 8 while the vehicle travels with the engine 1 being stopped. The ECU 30 starts the engine by increasing an engine revolution number Ne by cranking torque generated by engaging the clutch 2. That is, the ECU 30 starts the engine 1 by the power transmitted to the engine 1 via the clutch 2. The torque transmitted to the engine 1 via the clutch 2 includes torque transmitted from the drive wheels 8 via the manual transmission 3 and torque transmitted from the motor 4 via the manual transmission 3.

Here, a certain degree of magnitude of torque is necessary so that the engine 1 at rest rotates and starts cranking. In the description, torque at which the engine 1 starts cranking is referred to "cranking start torque". The cranking start torque is a lower limit of the clutch torque at which the cranking of the engine 1 becomes possible. Even if the clutch 2 is engaged, when the clutch torque of the clutch 2 is less than the cranking start torque, the engine 1 remains stopped. Note that the clutch torque corresponds to a degree of engagement of the clutch 2 and can be set to maximum torque which can be transmitted in the clutch 2.

When the clutch 2 is engaged, vehicle acceleration (vehicle G) of the hybrid vehicle 100 is reduced and the feeling of deceleration is generated. There is a possibility that the feeling of deceleration causes the driver to stop the release of the clutch pedal 41 expecting that the engine revolution number Ne increases and to keep the clutch stroke. This is related with, for example, that the cranking start torque which is necessary to start to increase a rotation of the engine 1 at rest is larger than torque which is necessary to increase a number of revolutions of the engine 1 already rotated. When a certain degree of the feeling of deceleration occurs, although the driver expects that the clutch 2 is sufficiently engaged and the engine revolution number Ne increases, there may occur a state that the clutch torque does not reach a magnitude capable of starting the rotation of the engine 1.

When the engine 1 remains stopped regardless that the driver expects the increase of the engine revolution number Ne, since the driver feels an uncomfortable feeling, there is a possibility that a drivability is lowered. It is preferable that when the clutch 2 is engaged, the engine 1 can be started more certainly.

In the vehicle control device 1-1 of the embodiment, when a hybrid travel range is selected during the EV travel as well as the clutch 2 is engaged, the motor 4 is caused to output assist torque for suppressing acceleration of the hybrid vehicle 100 from being lowered by that the clutch 2 is engaged. Even if the clutch 2 starts to engage, since the occurrence of the feeling of deceleration is suppressed, the driver is suppressed from stopping releasing the clutch pedal 41 before the clutch torque reaches the cranking start torque. With the operation, since it is expected that the driver certainly releases the clutch pedal 41 until the clutch stroke, at which the cranking starts, is obtained, the engine 1 can be more certainly started.

Here, when the braking operation is performed, if the motor 4 is caused to output the assist torque to the engagement of the clutch 2 likewise when the braking operation is not performed, there is a problem in that electric power is wastefully consumed. When a gear shift stage for travel is selected in a state that the brake pedal 42 is depressed and the clutch pedal 41 is released, the driver expects deceleration. In contrast, it results in an increase of electric power consumption by the motor 4 to suppress a generation of deceleration by the assist torque of the motor 4.

In the vehicle control device 1-1 of the embodiment, the assist torque when the braking operation is performed is smaller than the assist torque when the braking operation is not performed. In other words, the assist torque when the braking operation is performed is assist torque on a side where the acceleration of the hybrid vehicle 100 is reduced more than the assist torque when the braking operation is not performed. As a result, the electric power consumption of the hybrid vehicle 100 can be suppressed as explained below referring to FIG. 5.

FIG. 5 is a time chart according to a vehicle control of the embodiment. FIG. 5 shows the vehicle control when the braking operation is performed in a constant braking operation amount before the clutch 2 is engaged. In FIG. 5, (a) shows the clutch stroke of the clutch pedal 41, (b) shows the clutch torque, (c) shows a number of revolutions of the input shaft 3A of the manual transmission 3, (d) shows the engine revolution number Ne, (e) shows the vehicle acceleration, and (f) shows the MG torque, respectively. Further, reference signs 101, 103 show the vehicle acceleration and the MG torque when the braking operation is not performed, respectively (hereinafter, described as "vehicle acceleration at the time of non-braking" and "MG torque at the time of non-braking". Reference signs 102, 104 show the vehicle acceleration and the MG torque when the braking operation is performed, respectively (hereinafter, described as "vehicle acceleration at the time of braking" and "MG torque at the time of braking"). Note that, in FIG. 5, it is assumed that the motor 4 does not output torque other than the assist torque both at the time of braking and at the time of non-braking.

In the vehicle control device 1-1 of the embodiment, the assist torque is output to the motor 4 according to the clutch torque when a gear shift stage for hybrid travel is selected during the EV travel and the clutch 2 is engaged. A range, in which the assist torque is increased, is determined to the clutch torque, and the assist upper limit torque which is an upper limit of the range is based on the cranking start torque. When the clutch torque has reached predetermined assist upper limit torque, the assist torque of the motor 4 is not increased more than the predetermined assist upper limit torque.

The assist upper limit torque differs depending on whether or not the braking operation is performed. An assist upper limit torque Ts at the time of braking is smaller than the assist upper limit torque Ts1 at the time of non-braking. In other words, an increase of the assist torque is finished at a stage at which the clutch torque at the time of braking is smaller than that at the time of non-braking. As described above, even if the assist torque is more reduce at the time of braking than at the time of non-braking, it is deemed that the driver is not likely to feel the uncomfortable feeling and engine startability is not lowered thereby.

At the time of braking, the driver expects that deceleration is generated. Accordingly, it can be deemed that even if the feeling of deceleration occurs by finishing to increase the assist torque at a stage at which the clutch torque is small, the uncomfortable feeling is not likely applied to the driver who expects the deceleration. Accordingly, it can be expected that the driver continues a release operation of the clutch pedal 41 as it is until the cranking is started.

Note that when the vehicle acceleration 102 is reduced by stopping the increase of the assist torque at a time t2, there is also a possibility that the driver who feels the feeling of deceleration stops a clutch operation considering that the clutch 2 has been engaged. In the case, a time until the engine starts may become long and a shift to acceleration may be delayed. However, since the driver performs the braking operation and expects deceleration, it is deemed that even if a time until the engine starts becomes slightly long, operability is not likely lowered thereby.

An operation of the embodiment will be explained referring to FIGS. 1 and 5. A control flow illustrated in FIG. 1 is executed while the hybrid vehicle 100 travels and is repeatedly executed at, for example, a predetermined interval.

First, at step S100, whether or not the engine 1 is stopped is determined by the ECU 30. When the vehicle is in the EV travel, it is determined that the engine 1 is stopped (Yes) at step S100. As a result of determination at step S100, when it is determined that the engine is stopped (step S100-Y), a process goes to step S110, and when the engine is not stopped (step S100-N), the control flow is finished.

At step S110, whether or not an ENG gear is selected is determined by the ECU 30. The ENG gear is a gear shift stage in which the vehicle travels in a state that the engine 1 is in operation. When, for example, a selected gear shift stage is a gear shift stage for hybrid travel from the first gear speed to the fifth gear speed, an affirmative determination is made at step S110. As a result of determination at step S110, when it is determined that the ENG gear is selected (step S110-Y), the process goes to step S120, and when the ENG gear is not selected (step S110-N), the control flow is finished.

At step S120, whether or not the clutch 2 starts to engage is determined by the ECU 30. The ECU 30 can make the determination at step S120 based on a result of detection of the clutch pedal stroke sensor 44. The ECU 30 previously stores a value (meet point) of the clutch stroke at which the clutch 2 starts to engage and can make the determination at step S120 based on a result of comparison of a pedal stroke of the meet point with the detected pedal stroke. When it is determined that the clutch 2 starts to engage as a result of determination at step S120 (step S120-Y), the process goes to step S130, and when the clutch 2 does not start to engage (step S120-N), the control flow is finished.

At step S130, the assist upper limit torque is calculated by the ECU 30. The ECU 30 calculates the assist upper limit torque according to a braking operation amount. The ECU 30 calculates the assist upper limit torque based on, for example, the pedal stroke of the brake pedal 42 or master cylinder pressure of a brake device.

First, a method of determining the assist upper limit torque Ts1 at the time of non-braking will be explained. In the embodiment, the assist upper limit torque Ts1 at the time of non-braking is, for example, the cranking start torque. The assist upper limit torque Ts1 at the time of non-braking can be calculated by, for example, the following expression (1).

$$Ts1 = \text{maximum compression pressure} + \text{maximum static friction} \quad (1)$$

The ECU 30 can calculate the assist upper limit torque Ts1 at the time of non-braking based on the maximum compression pressure of the engine 1 and on maximum static friction torque of the engine 1.

Note that the assist upper limit torque Ts1 at the time of non-braking may be torque which starts the cranking within a predetermined time after torque is applied to the engine 1. When the engine 1 stops in the state that the torque is applied to the engine 1, air in a cylinder is reduced as a time passes and compression pressure is reduced. Accordingly, even if the torque starts to be applied, although the engine revolution number Ne does not increase instantly, there exists torque by which the cranking starts by the reduction of the compression pressure. When it is supposed that the torque by which the cranking starts within a predetermined waiting time is the assist upper limit torque Ts1 at the time of non-braking, the electric power consumption of the motor 4 can be suppressed.

Figure 7:
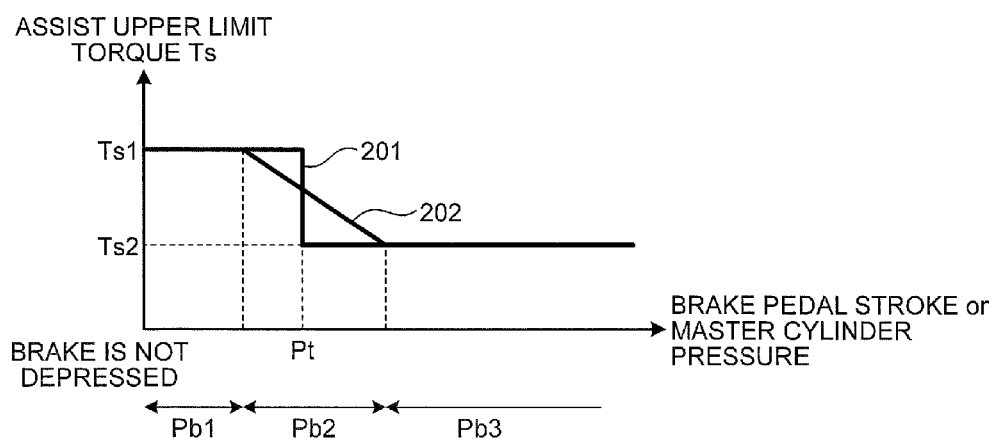
FIG. 7 is a view illustrating a relation between a braking operation amount and the assist upper limit torque.

Next, a method of determining the assist upper limit torque Ts at the time of braking will be explained. FIG. 6 is an explanatory view of the assist upper limit torque, and FIG. 7 is a view illustrating a relation between the braking operation amount and the assist upper limit torque. As illustrated in FIG. 6, the assist upper limit torque Ts at the time of braking is torque smaller than the assist upper limit torque Ts1 at the time of non-braking as well as is variable as shown by an arrow Y1. In the embodiment, the assist upper limit torque Ts at the time of braking is made variable according to the braking operation amount as explained referring to FIG. 7.

In FIG. 7, a horizontal axis shows the braking operation amount, for example, a brake pedal stroke or the master cylinder pressure. A reference sign 201 shows an example of the determination method of the assist upper limit torque Ts at the time of braking based on the braking operation amount, and a reference sign 202 shows another example of the determination method of the assist upper limit torque Ts at the time of braking based on the braking operation amount.

As illustrated in FIG. 7, in the assist upper limit torque Ts, a value when the braking operation amount is large is smaller than a value when the braking operation amount is small. The assist upper limit torque Ts at the time of braking may be any of a small value or a large value across a threshold value Pt of the braking operation amount as shown by, for example, the reference sign 201. As an example, the assist upper limit torque Ts at the time of braking may be a value similar to the assist upper limit torque Ts1 at the time of non-braking when the braking operation amount is smaller than the threshold value Pt and may be a value Ts2 smaller than the assist upper limit torque Ts1 at the time of non-braking when the braking operation amount is equal to or larger than the threshold value Pt. Note that when the assist upper limit torque Ts at the time of braking is discontinuously changed as described above, a hysteresis may be provided in the vicinity of the threshold value Pt.

Further, the assist upper limit torque Ts at the time of braking may be gradually changed in the vicinity of the threshold value Pt according to a change of the braking operation amount as shown by the reference sign 202 in place that the assist upper limit torque Ts is discontinuously changed at the threshold value Pt. That is, the assist upper limit torque Ts at the time of braking may be gradually reduced according to an increase of the braking operation amount. As an example, the assist upper limit torque Ts at the time of braking may be gradually reduced linearly according to the increase of the braking operation amount in an intermediate region Pb2 of the braking operation amount including the threshold value Pt, and the assist upper limit torque Ts at the time of braking may be set to predetermined values in a region Pb1 in which the braking operation amount is smaller than that in the intermediate region Pb2 and in a region Pb3 in which the braking operation amount is larger than that of the intermediate region Pb2, respectively.

When the assist upper limit torque according to the braking operation amount is calculated at step S130, the process goes to step S140.

At step S140, an MG assist is performed by the ECU 30 according to the assist upper limit torque and the degree of engagement of the clutch. The ECU 30 controls the assist torque output to the motor 4 based on the assist upper limit torque calculated at step S130 and on the degree of engagement of the clutch detected by the clutch pedal stroke sensor 44. The ECU 30 stores a correspondence relation between the clutch stroke detected by the clutch pedal stroke sensor 44 and the degree of engagement of the clutch. Here, the degree of engagement of the clutch is a degree of engagement between the input side engaging member 21 and the output side engaging member 22 of the clutch 2 and corresponds to the clutch torque of the clutch 2.

The ECU 30 sets the assist torque when the degree of engagement of the clutch 2 is large as torque larger than the assist torque when the degree of engagement of the clutch 2 is small, using the assist upper limit torque calculated at step S130 as an upper limit. In FIG. 5, when the clutch 2 starts to engage at a time t1 according to the operation input of the driver to the clutch pedal 41, assist torque 103, 104 generated by the motor 4 is increased according to an increase of the clutch torque.

At the time of non-braking, the ECU 30 increases the MG torque 103 according to the increase of the clutch torque when the MG torque 103 is less than an upper limit 103a corresponding to the assist upper limit torque Ts1 at the time of non-braking corresponds to. With the operation, a reduction of the vehicle acceleration 101 of the hybrid vehicle 100 which is caused by that the clutch 2 is engaged can be suppressed. In the embodiment, the assist upper limit torque Ts1 at the time of non-braking is made to the same torque as the cranking start torque. As a result, when the clutch torque reaches the assist upper limit torque Ts1 at the time of non-braking at a time t3, the cranking is started and the engine revolution number Ne starts to increase and the engine start is completed at a time t4.

Here, at the time of braking, when the assist torque of the motor 4 is generated up to the same clutch torque as that at the time of non-braking (up to the upper limit 103a of the assist torque at the time of non-braking), a state that the assist by the motor 4 is stopped by a brake occurs, and thereby electric power is wasted.

In the embodiment, the ECU 30 makes an upper limit (predetermined torque) 104a of the assist torque at the time of braking smaller than the upper limit (predetermined torque) 103a of the assist torque at the time of non-braking. At the time of non-braking, the ECU 30 increases the assist torque 103 according to the increase of the clutch torque using the upper limit 103a of the assist torque at the time of non-braking as an upper limit. Further, at the time of braking, the ECU 30 increases the assist torque 104 according to the increase of the clutch torque using the upper limit 104a of the assist torque at the time of braking as an upper limit.

The upper limit 103a of the assist torque at the time of non-braking corresponds to the assist upper limit torque Ts1 at the time of non-braking and suppresses a reduction of vehicle acceleration, which is caused by that the clutch 2 is engaged at the degree of engagement at which the assist upper limit torque Ts1 at the time of non-braking is achieved. In contrast, the upper limit 104a of the assist torque at the time of braking corresponds to the assist upper limit torque Ts at the time of braking and suppresses a reduction of vehicle acceleration, which is caused by that the clutch 2 is engaged by the degree of engagement at which the assist upper limit torque Ts at the time of braking is achieved. The electric power consumption can be reduced by that the upper limit 104a of the assist torque is reduced at the time of braking. Further, the vehicle acceleration 102 starts to reduce at the time t2 earlier than at the time of non-braking by that the upper limit 104a of the assist torque is reduced at the time of braking. As a result, an intention of deceleration of the driver shown by engaging the clutch 2 can be realized at an early timing.

Note that when the clutch torque cannot be estimated such as when the hybrid vehicle 100 is not provided with the clutch pedal stroke sensor 44, and the like, the assist torque of the motor 4 may be adjusted based on the vehicle acceleration 102. For example, when the MG torque is feedback controlled to realize target deceleration based on the braking operation amount, the reduction of the vehicle acceleration 102 caused by the engagement of the clutch 2 can be suppressed. At the time, when the assist upper limit torque Ts at the time of braking is made to upper limit torque of the MG torque, it becomes possible to reduce the electric power consumption at the time of braking, to realize the intention of deceleration of the driver at an early timing, and the like. When the MG assist is executed at step S140, the control flow is finished.

Note that, in the embodiment, as a method of making the assist torque when the braking operation is performed smaller than the assist torque when the braking operation is not performed, although the assist upper limit torque Ts at the time of braking is made smaller than the assist upper limit torque Ts1 at the time of non-braking, the embodiment is not limited thereto. For example, an increasing ratio of the assist torque may be smaller at the time of braking than at the time of non-braking with respect to an increase of the same clutch torque. For example, in FIG. 5, when the clutch 2 starts to engage at the time t1, a rising of the MG torque 104 at the time of braking may be made gentler than a rising of the MG torque 103 at the time of non-braking.

In the embodiment, although the assist upper limit torque Ts at the time of braking changes according to the braking operation amount, the assist upper limit torque Ts at the time of braking may be changed according to a still another parameter. For example, according to a charge state SOC of the battery 5, the assist upper limit torque Ts at the time of braking when the charge state SOC is low may be set to a value smaller than the assist upper limit torque Ts at the time of braking when the charge state SOC is high. Further, the assist upper limit torque Ts at the time of braking may be made variable according to environment parameters such as a gradient.

Modification of First Embodiment

A modification of the first embodiment will be explained referring to FIG. 8. In the first embodiment, although the control, which disposes a difference, which is determined depending on whether or not the braking operation is performed, to the upper limit of the assist torque when the clutch is engaged, is executed during the EV travel, the first embodiment is not limited thereto. A difference, which is determined depending on whether or not the braking operation is performed, may be disposed to the upper limit of the assist torque when the engine 1 is stopped, the clutch 2 is engaged while the vehicle travels, and the engine 1 is connected to the drive wheels 8 in addition to during the EV travel.

As an example, in a vehicle mounted with a free run system for executing a free run by stopping the engine 1 while the vehicle travels, it is possible to dispose the difference, which is determined depending on whether or not the braking operation is performed, to the upper limit of the assist torque when a gear shift stage for forward travel is selected and the clutch 2 is engaged.

Figure 8:
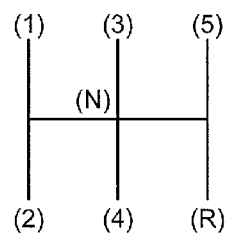
FIG. 8 is a view illustrating an example of a shift pattern of a vehicle on which a free run system is mounted.

FIG. 8 is a view illustrating an example of a shift pattern when the hybrid vehicle 100 is mounted with the free run system. The EV range is not provided different from shift pattern of the first embodiment (FIG. 4). When the N range is selected while the vehicle travels, the ECU 30 stops the engine 1. As an example, the ECU 30 stops the engine 1 when the clutch 2 is engaged in the state that the N range is selected. Since the manual transmission 3 is in the neutral state, a free run state in which no engine brake is applied to the drive wheels 8 is achieved and thus the hybrid vehicle 100 travels by inertia. In the free run, fuel consumption can be improved by stopping the engine 1.

The ECU 30 starts the engine 1 by the power transmitted to the engine 1 via the clutch 2 when the engine 1 stops in the free run, a gear shift range for forward travel from the first gear speed to the fifth gear speed is selected while the vehicle travels as well as the clutch 2 is engaged, in other words, when the clutch 2 is engaged and the engine 1 is connected to the drive wheels 8. At the time, likewise the first embodiment, the assist torque at the time of braking becomes smaller than the assist torque at the time of non-braking.

Second Embodiment

Figure 9:
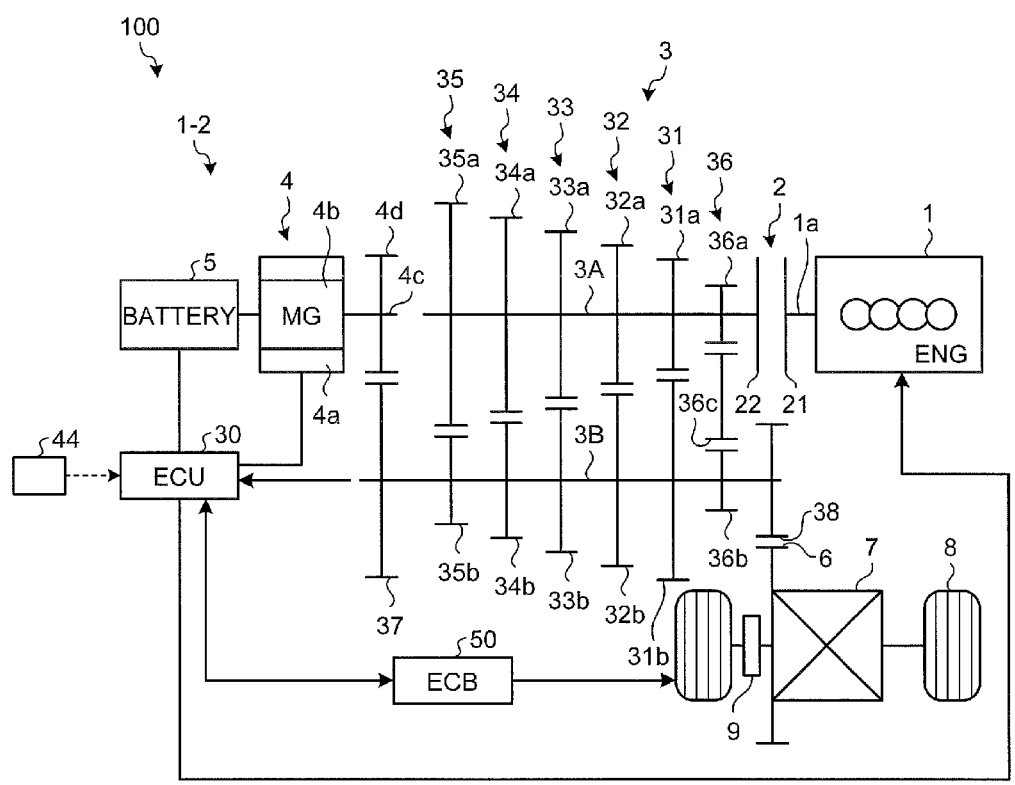
FIG. 9 is a view illustrating a schematic configuration of a vehicle according to a second embodiment.
Figure 10:
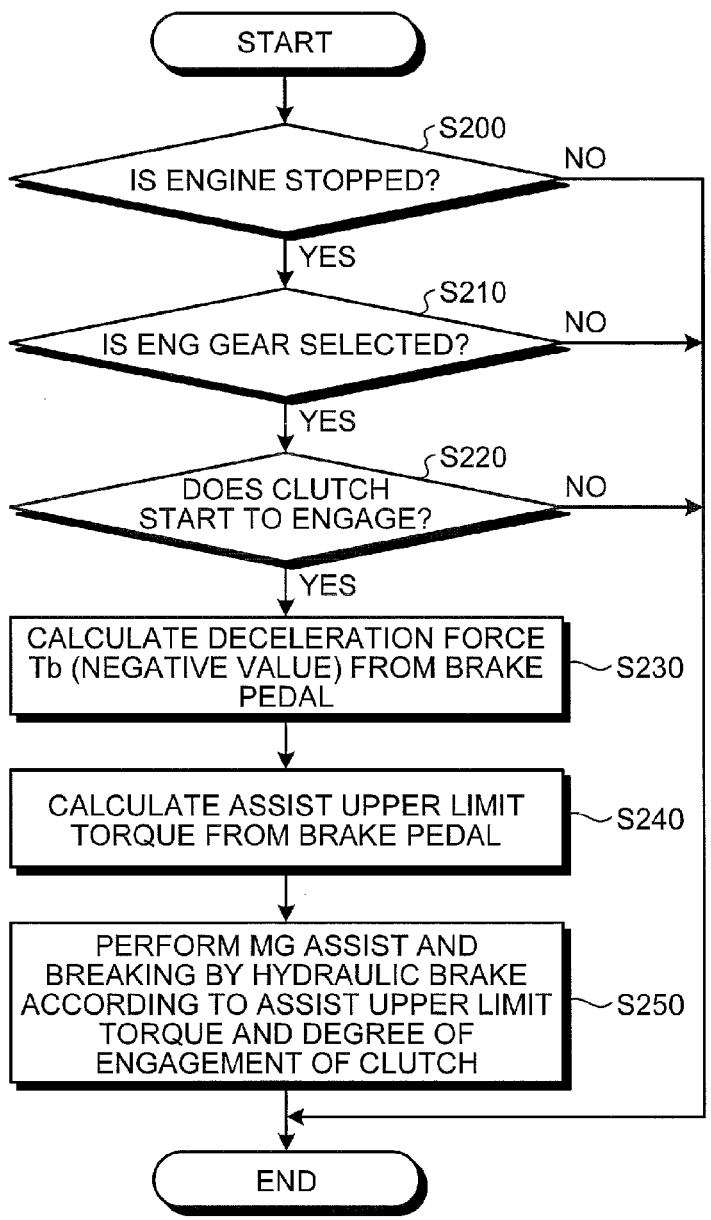
FIG. 10 is a flowchart illustrating an operation of the second embodiment.

A second embodiment will be explained referring to FIG. 9 to FIG. 15. As to the second embodiment, the components having the same function as that of the components explained in the embodiment are denoted by the same reference signs and a duplicate explanation will not be repeated. FIG. 9 is a view illustrating a schematic configuration of a vehicle according to the embodiment, and FIG. 10 is a flowchart illustrating an operation of the embodiment. A vehicle control device 1-2 of the embodiment is different from the vehicle control device 1-1 of the first embodiment in that an ECB 50 is provided, and when a braking operation is performed at the time a clutch is engaged to start an engine again, target deceleration force determined by the braking operation is distributed to deceleration force due to MG torque and an engagement of a clutch 2 and to deceleration force due to brakes. With the operation, a regeneration amount can be increased and electric power can be saved.

As illustrated in FIG. 9, the vehicle control device 1-2 of the embodiment includes the brakes 9 and the ECB 50 in addition to the components of the vehicle control device 1-1 of the first embodiment. The brakes 9 are braking devices capable of controlling brake force. The brakes 9 are, for example, hydraulic brakes capable of controlling the brake force by hydraulic pressure supplied thereto. The ECB 50 can control the brake force generated by the brakes 9 of respective wheels to brake force different from the brake force corresponding to a braking operation amount by a driver. For example, the ECB 50 can control the brake force of the respective wheels to desired values by controlling the hydraulic pressure supplied to the brakes 9.

The ECU 30 is connected to the ECB 50 and controls deceleration force generated to the hybrid vehicle 100 in cooperation with the ECB 50.

A vehicle control of the embodiment will be explained referring to FIG. 10. A control flow illustrated in FIG. 10 is executed when the hybrid vehicle 100 travels and repeatedly executed at, for example, a predetermined interval.

From step S200 to step S220 can be made the same as from step S100 to step S120 of the first embodiment (FIG. 1). That is, the ECU 30 goes to step S230 when the engine 1 is stopped (step S200-Y), an ENG gear is selected (step S210-Y), and the clutch 2 starts to engage (step S220-Y).

At step S230, deceleration force Tb is calculated by the ECU 30. The deceleration force Tb has a negative value. The ECU 30 calculates the deceleration force Tb based on a braking operation amount to the brake pedal 42. The deceleration force Tb is a target deceleration force determined by the braking operation of the driver. When the deceleration force Tb is calculated, a process goes to step S240.

At step S240, an assist upper limit torque is calculated by the ECU 30. The ECU 30 calculates the assist upper limit torque based on the braking operation amount to the brake pedal 42. The ECU 30 may calculate the assist upper limit torque likewise, for example, step S130 of the first embodiment. When step S240 is executed, the process goes to step S250.

At step S250, braking by the MG assist and the hydraulic brake is executed by the ECU 30 according to the assist upper limit torque and a degree of engagement of the clutch. The ECU 30 executes a brake control as explained below according to the assist upper limit torque calculated at step S240 and the degree of engagement of the clutch 2.

Figure 11:
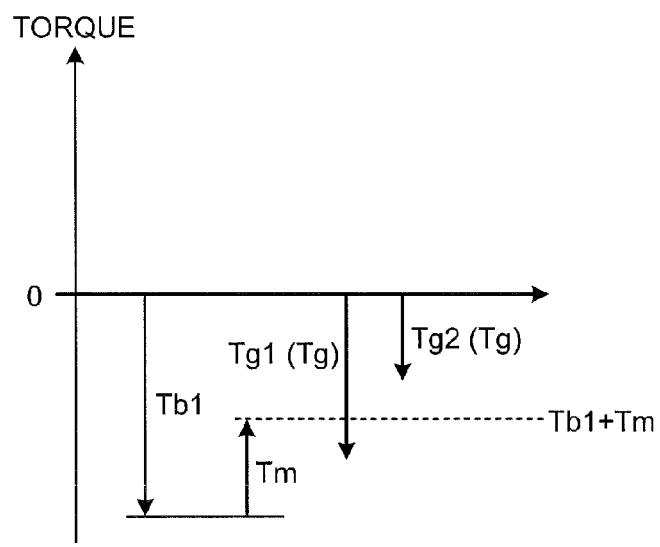
FIG. 11 is an explanatory view of a vehicle control when clutch torque can be estimated.

FIG. 11 is an explanatory view of the vehicle control when clutch torque can be estimated. In FIG. 11, a reference sign Tb1 shows a target brake torque corresponding to the deceleration force Tb calculated at step S230, and a reference sign Tm shows an assist torque at the time of braking according to the clutch torque. A sum (Tb1+Tm) of the target brake torque Tb1 and the assist torque Tm at the time of braking according to the clutch torque shows a target value of torque generated by a motor 4 and the brakes 9 (hereinafter, simply described as "first target torque").

Further, a reference sign Tg shows regenerative maximum torque of the motor 4. The regenerative maximum torque Tg is negative torque which can be output to the rotating shaft 4c when the motor 4 performs a regenerative power generation and has a maximum magnitude. The ECU 30 realizes the first target torque by the motor 4 when the first target torque can be realized by a regeneration operation performed by the motor 4, that is, when the regenerative maximum torque Tg is torque smaller than the first target torque (Tb1+Tm) as shown by a reference sign Tg1. The ECU 30 sets output torque of the motor 4 as the first target torque. At the time, brake torque generated by the brakes is set to 0.

In contrast, when the first target torque cannot be realized only by the regeneration operation by the motor 4, that is, when the regenerative maximum torque Tg is torque larger than the first target torque (Tb1+Tm) as shown by a reference sign Tg2, the ECU 30 realizes the first target torque by causing the motor 4 to cooperate with the brakes 9. The ECU 30 causes the motor 4 to generate power maximizing a regeneration amount of the motor 4 as well as sets brake torque generated by the brakes 9 to an amount which becomes insufficient by the regeneration operation of the motor 4 that is, to a value shown by the following expression (2).

$$\text{Brake torque generated by brakes} = Tb1 + Tm - Tg \qquad (2)$$

As described above, an increase of the regeneration amount by the motor 4 can be realized by placing a higher priority on the generation of brake torque by the regeneration operation of the motor 4 than on the generation of brake torque by the brakes 9.

Figure 12:
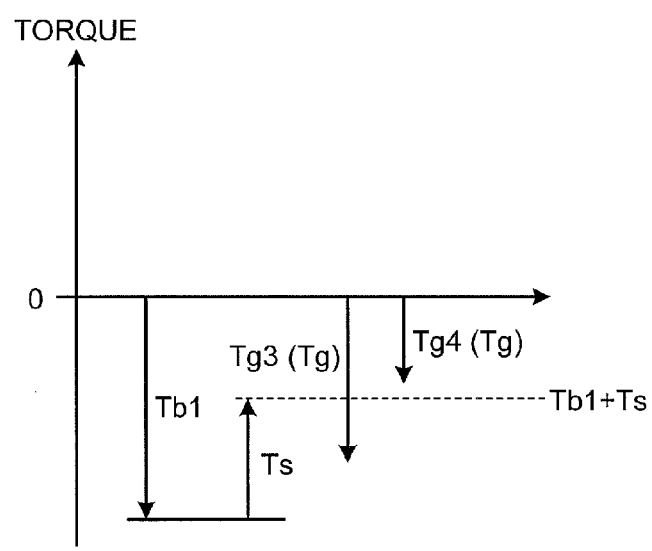
FIG. 12 is an explanatory view of a vehicle control when the clutch torque cannot be estimated.

FIG. 12 is an explanatory view of the vehicle control when the clutch torque cannot be estimated. When it is impossible to estimate the clutch torque as in a case that a vehicle is not provided the clutch pedal stroke sensor 44, it is sufficient to perform a torque control so that, for example, actual deceleration force becomes target deceleration force. The ECU 30 sets, for example, MG regeneration torque which realizes deceleration force determined by the braking operation amount when the clutch 2 is not engaged and the brake torque generated by the brakes 9 as initial values of the MG torque and the brake torque. The ECU 30 realizes the target deceleration force by a cooperative control of the motor 4 and the brakes 9 when the clutch 2 is engaged and the deceleration force is generated by the clutch torque. In the cooperative control, the MG torque and the brake torque of the brakes 9 are controlled to realize target deceleration force based on the braking operation of the driver.

At the time, when the deceleration force becomes excessive, priority can be placed on the generation of brake torque by the regeneration operation of the motor 4 by removing the brake force generated by the brakes 9 first and increasing the MG torque when the brake force generated by the brakes 9 becomes 0. The ECU 30 controls the brake torque generated by the brakes 9 and the MG torque as explained, for example, below.

A sum (Tb1+Ts) of the target brake torque Tb1 and the assist upper limit torque Ts at the time of braking which are shown in FIG. 12 shows a maximum value of a target value of torque generated by the motor 4 and the brakes 9 (hereinafter, simply described as "second target torque Tx"). As shown by a reference sign Tg3, when the regenerative maximum torque Tg is smaller than the second target torque (Tx=Tb1+Ts), there exists a region of the clutch torque in which the target deceleration force can be generated by the brake torque of the motor 4 without depending on the brake force generated by the brakes 9. That is, when the degree of engagement of the clutch 2 increases, there exists a case that the target deceleration force can be realized by the MG torque by reducing the brake force generated by the brakes 9 up to 0. The second target torque Tx is used as an upper limit of the MG torque when the MG torque is changed in the case.

Figure 13:
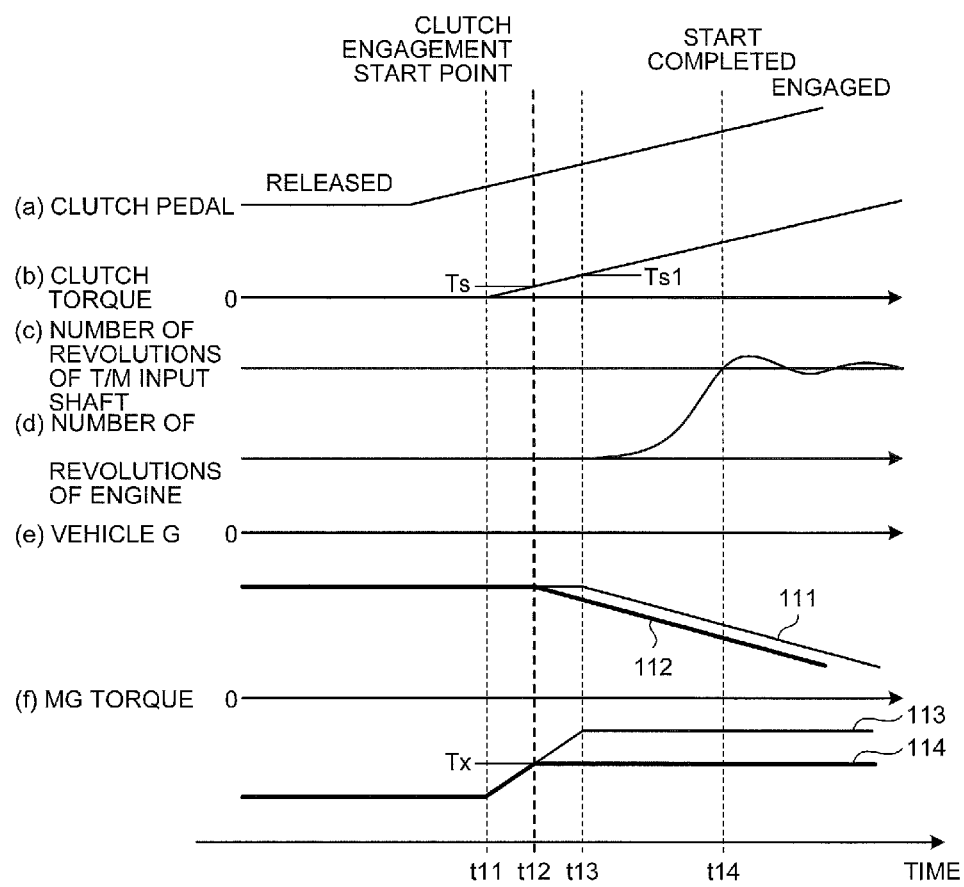
FIG. 13 is a time chart according to a vehicle control when a second target torque is larger than regenerative maximum torque.
Figure 14:
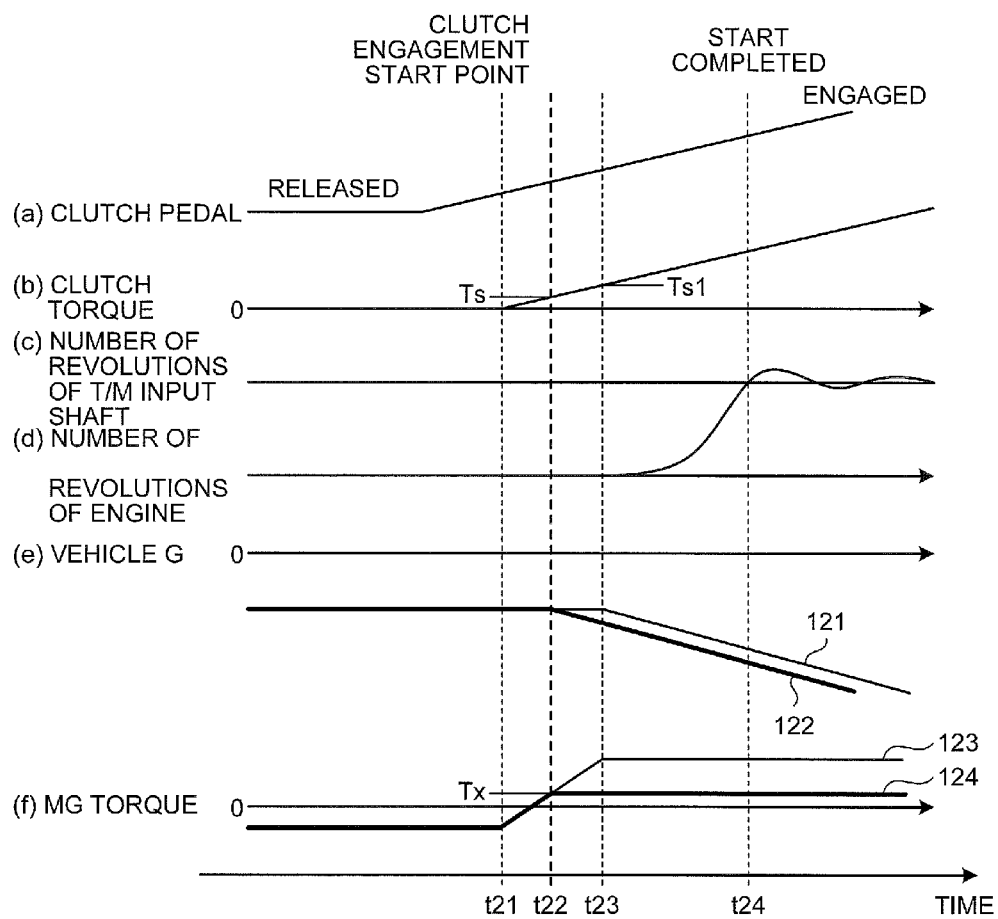
FIG. 14 is another time chart according to the vehicle control when the second target torque is larger than the regenerative maximum torque.

FIGS. 13 and 14 show time charts according to the vehicle control when the second target torque Tx is larger than the regenerative maximum torque Tg, respectively. FIG. 1 is a time chart when the second target torque Tx is negative, and FIG. 14 is a time chart when the second target torque Tx is positive.

In FIG. 13, a reference sign 111 shows a vehicle acceleration at the time of non-braking, a reference sign 113 shows the MG torque at the time of non-braking, a reference sign 112 shows the vehicle acceleration at the time of braking, and a reference sign 114 shows the MG torque at the time of braking. In FIG. 14, a reference sign 121 shows the vehicle acceleration at the time of non-braking, a reference sign 123 shows the MG torque at the time of non-braking, a reference sign 122 shows the vehicle acceleration at the time of braking, and a reference sign 124 shows the MG torque at the time of braking.

In FIGS. 13 and 14, the vehicle acceleration becomes a negative value by that the braking operation is performed before the clutch 2 starts to engage. Further, FIGS. 13 and 14 show a case that the deceleration force according to the braking operation amount can be generated by the brake torque of the motor 4, and the ECU 30 applies a brake to the hybrid vehicle 100 by the regeneration operation of the motor 4 without operating the brakes 9. In FIG. 13, when the clutch 2 starts to engage at a time t11, the MG torque 114 is controlled based on deceleration of the hybrid vehicle 100. The ECU 30 controls the MG torque 114 based on, for example, the forward/rearward acceleration of the hybrid vehicle 100 detected by an acceleration sensor so that actual acceleration becomes acceleration according to the braking operation amount.

The MG torque 114 reaches the second target torque Tx as an upper limit at a time t12. Thereafter, even if the clutch torque increases and the vehicle acceleration 112 is reduced, the MG torque 114 is kept at the second target torque. Since the MG torque 114 at the time of braking is made smaller than the MG torque 113 at the time of non-braking, the regeneration amount of the motor 4 increases. Note that a time t13 is a time at which the clutch torque reaches the assist upper limit torque Ts1 at the time of non-braking, and a time t14 is a time at which a start of the engine 1 is completed.

This is the same also as to FIG. 14, the clutch 2 starts to engage at a time t21, and the MG torque 124 at the time of braking reaches the second target torque Tx at a time t22. After the time t22, the MG torque 124 is kept at the second target torque Tx. Here, different from FIG. 13, since the MG torque after the time t22 has a positive value, the motor 4 consumes electric power and generates the assist torque. Since the MG torque 124 at the time of braking has a value smaller than the MG torque 123 at the time of non-braking, the electric power consumed by the motor 4 is suppressed. Note that a time t23 is a time at which the clutch torque reaches the assist upper limit torque Ts1 at the time of non-braking, and a time t24 is a time at which the start of the engine 1 is completed.

Next, the vehicle control when the second target torque Tx is smaller than the regenerative maximum torque Tg will be explained. As shown by a reference sign Tg4 in FIG. 12, when the regenerative maximum torque Tg is larger than the second target torque (Tx=Tb1+Ts), even if the MG torque is set to the regenerative maximum torque Tg, the second target torque Tx cannot be realized. In the case, the ECU 30 sets the MG torque to the regenerative maximum torque Tg and causes the brakes 9 to generate the insufficient brake torque. Specifically, the ECU 30 adjusts the brakes 9 setting an upper limit value of the brake torque generated by the brakes 9 to a value of the following expression (3) and sets the MG torque to the regenerative maximum torque Tg.

$$\text{Upper limit of brake torque generated by brakes} = Tb1 + Ts - Tg \quad (3)$$

FIG. 15 shows a time chart according to the vehicle control when the second target torque Tx is smaller than the regenerative maximum torque Tg. In FIG. 15, (g) shows the brake torque generated by the brakes 9. A reference sign 131 shows the vehicle acceleration at the time of non-braking, a reference sign 133 shows the MG torque at the time of non-braking, a reference sign 132 shows the vehicle acceleration at the time of braking, a reference sign 134 shows the MG torque at the time of braking, and a reference sign 135 shows the brake torque generated by the brakes. Before a time t31, a braking operation is started by the driver. The ECU 30 sets the MG torque 134 to the regenerative maximum torque Tg and further realizes the target brake torque Tb1 according to the braking operation amount by generating the brake torque 135 by the brakes.

When the clutch 2 starts to engage at a time t31, the ECU 30 reduces a magnitude of the brake torque 135 generated by the brakes (reduces the brake force) to realize the target brake torque Tb1. A reduction of the acceleration 132 of the hybrid vehicle 100 caused by that the clutch 2 is engaged is suppressed by reducing the magnitude of the brake torque 135 generated by the brakes. That is, the ECU 30 causes the brakes 9 as the braking devices to output the assist torque in place of the motor 4. Note that a part of the assist torque may be output by the brakes 9 in addition to a total amount of the assist torque.

The ECU 30 sets the upper limit of the brake torque 135 generated by the brakes to 0 and increases the brake torque 135. Further, even if the clutch torque further increases after the brake torque 135 generated by the brakes has become 0, the ECU 30 keeps the MG torque 134 at the time of braking to the regenerative maximum torque Tg without generating the assist torque by the motor 4. With the operation, although the vehicle acceleration 132 is reduced after a time t33, since the braking operation is being performed, the uncomfortable feeling is not likely applied to the driver. According to the control, since the MG torque 134 at the time of braking can be kept at the regenerative maximum torque Tg, the regeneration amount can be more increased than when the assist torque is generated by the motor 4 as in the MG torque 133 at the time of non-braking. Further, the assist torque is generated by the brake torque 135 until the brake torque 135 generated by the brakes becomes 0. Accordingly, it is suppressed that the vehicle acceleration 132 starts to reduce before the cranking starts, and thereby startability of the engine 1 can be secured.

The contents disclosed in the respective embodiments can be executed by being appropriately combined.

REFERENCE SIGNS LIST 1-1, 1-2 vehicle control device
1 engine
2 clutch
3 manual transmission
4 motor 8 drive wheel
30 ECU
100 hybrid vehicle
103a upper limit of assist torque at the time of non-braking
104a upper limit of assist torque at the time of braking
ts assist upper limit torque at the time of braking
ts1 assist upper limit torque at the time of non-braking

The invention claimed is:

1. A vehicle control device comprising:
an engine;
a motor disposed nearer to drive wheel sides than the engine in a vehicle;
a clutch disposed between the engine and the motor and configured to be engaged or released according to an operation input; and
an electronic control unit having control logic configured to cause the electronic control unit to cause the motor to output positive assist torque, wherein
when the clutch is engaged to connect the engine and drive wheels at a time that the vehicle travels with the engine being stopped, the engine is started by the power transmitted to the engine via the clutch, and the electronic control unit causes the motor to output positive assist torque that suppresses a reduction of acceleration of the vehicle that occurs when the clutch is engaged, and
the positive assist torque output by the motor when a braking operation is performed is smaller than the positive assist torque output by the motor when the braking operation is not performed.

2. The vehicle control device according to claim 1, wherein
the electronic control unit is configured to set a preset predetermined torque as an upper limit and the positive assist torque is increased according to an increase of a degree of engagement of the clutch at the time the clutch is engaged, and
the predetermined torque set by the electronic control unit when the braking operation is performed is smaller than the predetermined torque set by the electronic control unit when the braking operation is not performed.

3. The vehicle control device according to claim 2, wherein
the predetermined torque set by the electronic control unit when the braking operation is not performed corresponds to the degree of engagement of the clutch when cranking of the engine starts.

4. The vehicle control device according to claim 2, further comprising:
a braking device capable of controlling brake force, wherein
when the clutch is engaged to connect the engine and the drive wheels at the time that the vehicle travels with the engine being stopped, the electronic control unit cooperatively controls the motor and the braking device based on a target deceleration force that is based on the braking operation.

5. The vehicle control device according to claim 2, further comprising:
a manual transmission disposed between the clutch and the drive wheels, wherein
a hybrid travel, in which the vehicle is caused to travel by the power of the engine and the power of the motor, and an EV travel, in which the vehicle is caused to travel by the power of the motor without depending on the power of the engine when the manual transmission is in a neutral state, can be executed, and
when a gear shift stage for the hybrid travel is selected in the manual transmission during the EV travel as well as when the clutch is engaged to shift the EV travel to the hybrid travel, the electronic control unit causes the motor to output the assist torque.

6. The vehicle control device according to claim 1, further comprising:
a braking device configured to control brake force, wherein
when the clutch is engaged to connect the engine and the drive wheels at the time that the vehicle travels with the engine being stopped, the electronic control unit cooperatively controls the motor and the braking device based on a target deceleration force that is based on the braking operation.

7. The vehicle control device according to claim 6, wherein
at least a part of the positive assist torque is generated by reducing a magnitude of brake torque generated by the braking device.

8. The vehicle control device according to claim 6, wherein
a generation of deceleration force by a regeneration of the motor is preceded by a generation of deceleration force by the braking device.

9. The vehicle control device according to claim 1, further comprising:
a manual transmission disposed between the clutch and the drive wheels, wherein
a hybrid travel, in which the vehicle is caused to travel by the power of the engine and the power of the motor, and an EV travel, in which the vehicle is caused to travel by the power of the motor without depending on the power of the engine when the manual transmission is in a neutral state, can be executed, and
when a gear shift stage for the hybrid travel is selected in the manual transmission during the EV travel as well as when the clutch is engaged to shift the EV travel to the hybrid travel, the electronic control unit causes the motor to output the positive assist torque.

* * * * *